May 12, 1936.  I. G. LOE  2,040,390
FLUID METER
Original Filed Oct. 13, 1931  2 Sheets-Sheet 1

INVENTOR.
Ira G. Loe.
BY
Fay, Oberlin & Fay
ATTORNEYS.

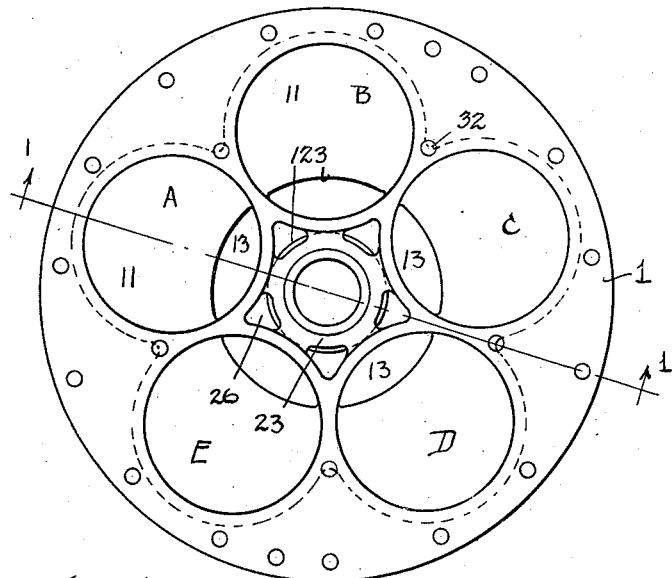
Fig. 4
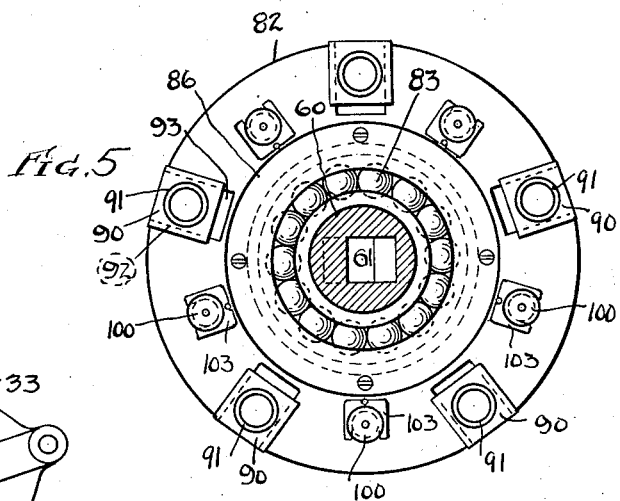
Fig. 5
Fig. 6
INVENTOR.
Ira G. Loe
BY
Fay, Oberlin + Fay
ATTORNEYS.

Patented May 12, 1936

2,040,390

UNITED STATES PATENT OFFICE 2,040,390

FLUID METER

Ira G. Loe, Cleveland, Ohio, assignor of one-fourth to John C. Brayton, Cleveland, Ohio Application October 13, 1931, Serial No. 568,561
Renewed March 28, 1936

13 Claims. (Cl. 73—30)

This invention relates to mechanisms for accurately gauging the quantities of fluids which pass therethrough and is particularly adapted for application to a displacement type meter for liquids.

The invention aims to provide a displacement type apparatus in which the movement of a series of pistons is translated into rotational movement and such rotational movement in turn actuates an indicator. The more particular purposes of the invention are to provide a wabble plate type of meter particularly adapted for the measurement of gasoline or like volatile liquids in which the construction is relatively simple, adjustment for a high degree of accuracy may be obtained by simple means and without dismantling the apparatus, in which the assembly is simple but accurate, in which provision is made for the thorough and automatic lubrication of all moving parts by means of the liquid being measured insofar as the liquid has any lubricating value, and in which provision is made for the automatic relief of any gas pressures which may occur due to the volatility of the liquid.

It will be appreciated that a meter of this type, although ordinarily moved by the passage of liquid therethrough, may be driven so as to act as a pump, in which case the various advantages would include accuracy in dispensing exact amounts of liquid. It will also be appreciated that the principles of the invention might be applied to a meter for fluent materials other than liquids, although the preferred form herein shown is particularly adapted for liquids.

Other aims and purposes of the invention will appear from the description hereafter. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 1:
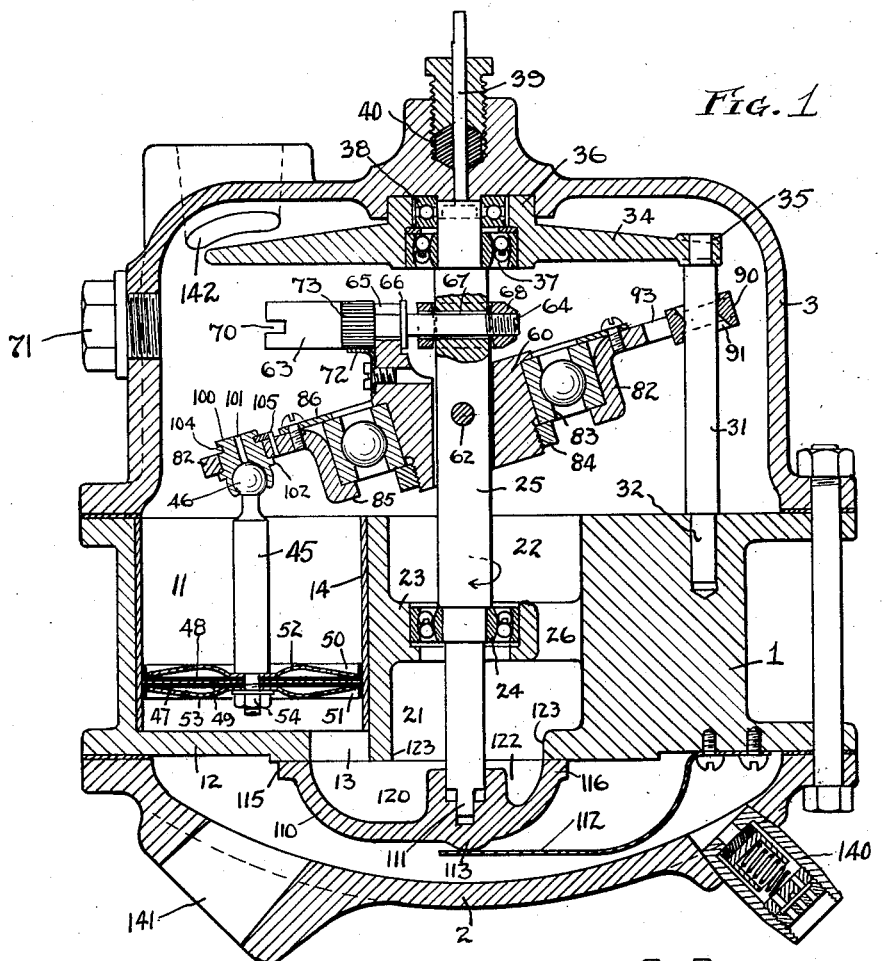
Figure 2:
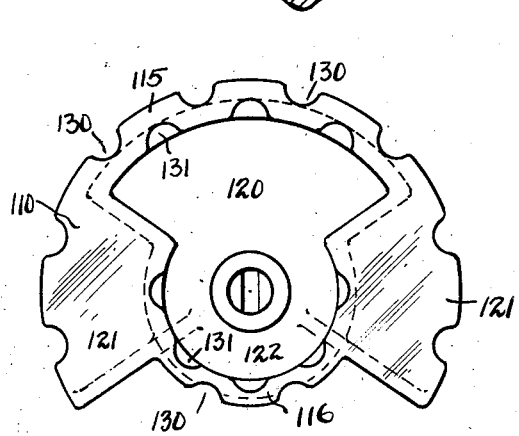
Figure 3:
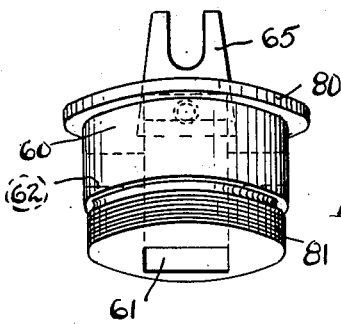

In the accompanying drawings Fig. 1 is a vertical central section through the assembly taken on the line 1—1 of Fig. 4, Fig. 2 is a face view of the valve, Fig. 3 is a perspective view of the inclined connector or wabble member, Fig. 4 is a plan view of the cylinder block looking down, Fig. 5 is a face view of the wabble plate assembly, the wabble member appearing in section, and Fig. 6 is a plan view of the guide rods spider.

Referring now particularly to Fig. 1, the meter comprises a cylinder block 1 having secured at the bottom thereof a sump housing 2 and having a discharge casing 3 secured at the top.

The cylinder block includes a plurality of cylinders 11, preferably five in number, disposed at equal circumferential intervals and at equal radial distances from the block 1. In the preferred construction shown the length of the cylinders is less than the thickness of the block 1, the tops of the cylinders being open and their bottoms being formed by the remaining metal in the cylinder block as at 12. Each cylinder has at its closed end a port 13 of double convex shape and plan as seen in Fig. 4. The usual cylinder liners 14 are provided.

The center of the block 1 is cored out leaving spaces as at 21 and 22 which are open at top and bottom. A web 23 in the block 1 separates the spaces 21 and 22 and carries a bearing 24 and a main shaft 25. The spaces 21 and 22 are connected by means of passages 26. Guide rods 31, five in number in the form shown, and shouldered near top and bottom, are set vertically in the block 1 in long seats 32 which are preferably bored in the block 1. A spider 33 having five arms 34 is seated on top of the guide rods engaging as at 35 with the upper ends of the respective rods. Thus a rigid and accurately constructed cage is formed. A hub 36 formed centrally of the spider enters a corresponding socket in the casing 3, thus giving additional strength against displacement. A side bearing 37 and a thrust bearing 38 are centrally carried by the spider. The main shaft 25 rotates in these and in the bearing 24 already mentioned. A stem 39 extends from the main shaft 25 through a suitable stuffing box 40 in the casing 3. This stem is the connection to suitable indicating means (not shown).

Each cylinder contains a piston having a stem 45 carrying at the bottom a piston assembly hereafter described, and at the top a ball 46. The piston assembly comprises a supporting disk 47 of slightly less diameter than the cylinder 11. Cup leathers 48 and 49 having respectively an upturned flange 50 and a downturned flange 51 are held upon the upper and lower faces respectively of the supporting disk 47 by spring disks 52 and 53. The entire assembly is fastened to a lower end of the stem 45 by suitable means, such as a reduced portion threaded and carrying a nut 54. An important feature of the piston construction is that the clearance between the edge of the disk 47 and the cylinder liner 14 is less than the thickness of the leather flange 50 or 51. The diameter of each of the springs 52 and 53 is less, by the thickness of the flange 50 or 51, than the inside diameter of the liner 14. By this means the piston assembly can be tilted from the horizontal which results from the inclination of the stem 45 from the vertical as the ball 46 moves through its stroke on an arcuate path, but the leather flanges cannot be forced past the edge of the supporting disk 47. This construction has the further advantage that the disk 47 may be made of thin material, because the only bending stresses which it must resist solely by its own unsupported strength are the thrusts of the flanges 50 or 51, and these are exerted only on so much of the disk rim as lies outside the perimeters of the springs 52 and 53. It will be understood that "leather" as used herein is descriptive but not limiting and applies also to any other material of suitable characteristics.

The reciprocating motion of the pistons is converted into rotary motion by means of a wabble plate assembly, seen in top face view in Fig. 5, which is secured to the shaft 25 for rotation therewith. This wabble plate assembly comprises a central member or wabble member 60. An opening 61 at an inclination to the axis of the wabble member and sufficiently larger than the shaft 25 to permit considerable play, is connected to the shaft 25 by a transverse pivot pin 62. It will be apparent from Fig. 1 and from the foregoing description that the inclination of the wabble member 60 upon the shaft 25 may be varied within limits imposed by the clearance of the shaft within the passage 61 and that the pin 62 will prevent the member 60 from movement axially of the shaft but will cause the wabble member 60 and the shaft to rotate together.

This adjustment is secured by means of an adjusting screw which comprises a head 63 and a shank 64. The screw is mounted in a slotted lug 65 extending up from one side of the wabble member 60 and has a flange 66 which cooperates with the front face of the head 63 to prevent the adjusting screw from moving forward and back with reference to the wabble member 60 while allowing it to be turned. The shank 64 goes through the shaft 25 in a transverse bore 67 of sufficiently greater diameter to allow considerable play. A collar 68 surrounds the shaft 25 at the bore and has on one side an unthreaded hole registering with the bore and of about the same diameter while on the other side it has a threaded hole in which the threaded end of the shank 64 takes. The middle inside diameter of the ring 68 is a sliding fit on the shaft 25 but flares upwardly and downwardly so that the ring can tilt to some extent on the shaft.

The head 63 is slotted as at 70 to take a screw driver which may be inserted by removing the plug 71 in the side of the casing 3. A spring finger 72 catching longitudinal grooves 73 on the head 63 locks the adjusting screw at any given setting.

The wabble member 60 has a top flange 80 and a bottom threaded section 81. A stroke disk 82 is connected to the wabble member by means of a ball bearing 83 which is assembled with the wabble member in any convenient way. The preferred assembly comprises a locking ring 84 screwed to the threaded portion 81, thus holding the inner race of the ball bearing up against the flange 80, it being understood that this race fits closely on the wabble member. The outer race of the bearing 83 is clamped between a downward and inward extending flange 85 on the stroke disk and a retainer ring 86 fastened to the upper surface of the stroke disk. The stroke ring is prevented from turning by the guide rods 31 but can move up and down on these rods as the wabble member 60 turns. The immediate connection between the stroke ring and the guide rods is by means of guide rod bushings 90 having a central inside diameter making a sliding fit with the rods 31 and flared above and below as at 91 to permit inclination with respect to the rods. These bushings are grooved at the side as at 92 and slide on the edges of radial slots 93 in the wabble plate 82.

The piston stems 45 are connected to the wabble plate by ball and socket joints. As already mentioned, each piston stem has a ball 46 at its upper end. This is surrounded by a socket in the lower end of a retainer 100. As here shown, the retainer 100, which has a central axial lubricating hole 101, is cylindrical in form and is set in the stroke disk near the edge with a flange 102 bearing against the under face of the disk. A clip 103 resting on the upper face of the disk engages in a slot 104, thus locking the retainer 100 in place. Displacement of the clip 103 is prevented by a pin 105.

The valve mechanism comprises a rotating concave member 110 the face of which is shown in Fig. 2. This valve is slotted to a tongue 111 on the lower end of the main shaft 25 so as to turn therewith but to be capable of axial movement with respect thereto either for disassembly, or to a more limited extent, for pressure relief, which will be described hereafter. The valve 110 has a flat face of varying form which seats on the bottom of the cylinder block 1, rotating thereon. The valve is kept on the tongue 111 and held tightly up to its seat by suitable resilient means, a convenient form here being shown as a leaf spring 112, fastened to the under side of the cylinder block 1 within the sump casing 2 and bearing at its free end against a button 113 on the bottom of the valve. This spring is only stiff enough to overcome the weight of the valve and the static head of liquid above the valve. The pressure of fluid supplied to the sump is utilized for the firm seating of the valve. The valve bottom exposes a considerable area to upward pressure not balanced from above, inasmuch as a considerable top area is cut off from pressure by the valve seat and other parts of the cylinder block 1.

The face of the valve comprises an outer rim 115 and an inner rim 116 of less diameter but concentric. The outer rim defines a passage 120 which occupies a sector somewhat greater than a quadrant and which is terminated by two flat portions 121 each extending inward to the inside diameter of the inner rim 116. The inner rim in turn defines a passage 122 which is really a part of 120 and in constant communication therewith. This inner rim 116 registers, as it revolves, with a circular opening 123 at the bottom of the space 21. It will be seen that in Fig. 1 the space 21 is wider to the right of the main shaft 25 than to the left. The reason of this is that the section at the right side of the cylinder block is taken where the block is relieved between two adjacent cylinders whereas the section at the left side is shown a full cylinder width.

In order to prevent any cutting between the valve face and the valve seat, provision is made to permit access of the liquid to all portions of both surfaces during some part of the revolution so that the surfaces never run dry. Even with liquid of such low lubricating value as gasoline, it has been found that this prevents the valve from ultimately forming a lap seat which will freeze or stick. This is accomplished by having a series of notches 130 in the outer edges of the rims 115 and 116 and a similar series of notches 131 in the inner edges. The combined radial depth of successive notches is equal to or greater than the thickness of the edge in which the notches occur. The surfaces 121 are similarly notched at their edges where they are always running on a seat and the broad surfaces are wet by passing under the ports 13.

A relief valve 140 of any standard construction and venting to any suitable container is secured in one side of the sump housing 2.

The supply of liquid to the meter is by means of the inlet 141 and the outlet is shown at 142. The liquid flowing in will fill the sump.

For convenience in describing the operation the five cylinders have been lettered A, B, C, D, and E in Fig. 4, and it will be understood that these letters in the following description also indicate the corresponding valves and other elements. The rotation of the main shaft and of the wabble plate, as the latter is seen in Fig. 5 and as both would be seen if they appeared in Fig. 4, is clockwise. See the arrow on Fig. 1. In the position shown in Fig. 1 the portion 120 of the valve completely uncovers the port 13 of cylinder A, which is the only port seen in that figure. The lesser diameter 116 of the valve thus leaves ports 13$^C$, behind the plane of Fig. 1, and 13$^D$, in front of the plane of Fig. 1, at least partly open to the sump. It will be apparent from the position of the wabble plate in Fig. 1 that while the piston in cylinder 11$^A$ is moving down those in 11$^C$ and 11$^D$ will be rising, thus admitting liquid to those cylinders. It does not appear necessary to follow the exact movement of all the parts in detail, but it will be apparent in general from the foregoing description and explanation that the port 13 of each cylinder will be open to the sump on its instroke and open to the spaces 21 and 22 and thus to the outlet on the outstroke.

It is apparent from the description above that the angular adjustment of the wabble member 60 on the shaft 25 is regulated by the adjusting screw, inasmuch as the collar 68 has no sidewise movement but can tilt and the turning of the adjusting screw will cause the flange 66 or the front end of the head 63, as the case may be, to bear against the lug 65, thus tilting the wabble member 60 about its pivot 62. In the form of apparatus here shown the normal position of the wabble member, with the sides of the bore 61 parallel to the sides of the shaft 25, puts the stroke plate 82 at an inclination of 16° from the horizontal, assuming the shaft 25 to be vertical. By the adjustment screw 63 this inclination may be changed to any within a range from 14° up to 18°, which will shorten or lengthen the piston stroke to such an extent as to make a difference in measurement of approximately 200 cubic inches above or below normal in measuring 1155 cubic inches or five gallons. Thus by simply removing the plug 71 and inserting a screw driver, the meter can be very readily adjusted to a high degree of accuracy. Since the ring 68 fits closely upon the shaft 25 despite the slight tilt due to the change in position of the screw 63, and since the spring finger 72 automatically locks in the proper groove 73, and since the motion of the mechanism and flow of liquid cannot have any tendency to turn the screw 63, it will be seen that once any given setting of the screw 63 is made the meter is as permanently and as accurately adjusted to that setting as though it were not capable of any other. On the other hand, as explained, changes in setting can readily be made. In accordance with the usual practice it may be assumed that the plug 71 will be secured in position by the authorities who inspect weights and measures, if such a practice prevails in the locality where the meter is used.

Since it is a fact that more or less dirt is carried by the liquid in spite of any strainers, the pistons are made up as already described so that the center supporting disk 47 gives support and guidance while the upturned flange 50 of the top leather 48, which is pressed outward against the cylinder was by liquid pressure as the piston moves up, serves as a scraper to push out particles of dirt and keep them from lodging between the flange 51 of the bottom leather 49. Thus the top leather serves as a wiper and the bottom leather as a pressure packing, but in each instance the vertical disposition of the flange makes the leather self-packing.

A well known problem with gasoline pumps arises from the fact that sunshine and summer temperatures cause high gas pressures in the system. Sometimes these occur quickly and arise to pressures as great as 250 pounds to the square inch. Such pressures frequently cause breakage of sight glasses, rapid deterioration of hose, and other objectionable results.

To avoid this and allow such pressures to work back and be relieved without danger or injury to any parts, I have arranged the valve 110 so as to be axially movable upon the blade 111 at the bottom of the shaft 25 and have held it on only by spring pressure. Thus back pressures in excess of the pressure of the spring 112 will slightly lower the valve 110 off its seat letting the pressure back into the sump, where it is relieved by the relief valve 140, it being understood that this relief valve drains back into the underground tank or elsewhere, as desired.

One of the problems of a successful gasoline meter is to avoid excessive wear of contacting moving metal surfaces. Any ordinary lubricant is of course quickly washed away by the gasoline and the lubricating value of the gasoline itself is so slight as to be ineffective unless special provisions are made for its free access between all moving surfaces. Such free access is accomplished in my improved meter by the means already described in detail in connection with the valve 110 and at the ball bearings 24, 37, 38, and 82 by having all these made with widely separated races open at each side and constantly submerged in gasoline. Lubrication of the guide rod bushings 90 both on the guide rods 31 and on their seats 93 is similarly accomplished inasmuch as these elements have considerable movement always in a gasoline bath. The hole 101 in the top of each of the piston ball retainers 100 admits gasoline above the ball 46 while the movement of the retainer over the ball allows the sides to be wet by gasoline.

It will be seen from the foregoing that I have invented a gasoline meter of the piston type in which a high degree of accuracy can be attained and maintained by very simple and readily accessible adjusting means. It will further be seen that the meter is characterized by simplicity of construction and provides for the ready relief of excess pressures, for the efficient lubrication of relatively moving surfaces by an inherently inefficient lubricating agent, for self cleaning and self packing pistons, for a rigid and accurate wabble plate guide construction, for ease of assembly, accessibility of moving parts, and other advantages which will be apparent to those skilled in the art.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a fluid measuring device a shaft adapted to rotate when the meter is measuring, a plurality of cylinders disposed about said shaft and coaxial therewith, a piston in each of said cylinders, means permitting limited inclination of each piston in its cylinder, an axial stem secured to each piston, a stroke ring connected to all of said pistons by said stems, and a wabble plate fixed to said shaft for rotation therewith within and connected to said stroke ring but rotatable with respect to said stroke ring, adjusting means between said wabble plate and said shaft comprising a pivot between said shaft and said wabble plate, said pivot being transverse to said shaft, and means for moving said wabble plate upon said pivot.

2. In a fluid measuring device of the class having a main shaft, a plurality of cylinders coaxial with said main shaft, a piston in each of said cylinders, means packing each piston in both directions of movement, an axial stem secured to each piston, a wabble plate connection between said piston stems and said shaft, said connection including a wabble member sleeved upon said shaft, said wabble member having a diagonal bore of greater diameter than said shaft, connecting means between said shaft and said member disposed transversely to said shaft, adjusting means between said shaft and said member for altering the angular relation between the two, and locking means for said adjusting means.

3. In a fluid measuring device of the class having a casing surrounding a plurality of coaxial cylinders surrounding a main shaft, such main shaft, pistons in said cylinders, means packing each piston in both directions of movement and permitting limited inclination of each piston in its cylinder, piston stems, and a wabble assembly, said piston stems connecting said pistons and wabble assembly, a wabble member constituting an element of said assembly sleeved upon said shaft, said wabble member having a diagonal bore of greater diameter than said shaft, connecting means between said shaft and said member transverse to said shaft, adjusting means between said shaft and said member for altering the angular relation between the two, locking means for said adjusting means, and a removable closure in said casing giving access to said adjusting means.

4. In a fluid measuring device of the class having a plurality of cylinders, a main shaft about which said cylinders are disposed, pistons in said cylinders, piston stems and a wabble plate assembly connecting said pistons and said shaft, a wabble member constituting an element of said wabble assembly sleeved upon said shaft, said wabble member having walls defining a diagonal bore of greater diameter than said shaft, a transverse pivot through said shaft and into said walls, a lug upon said wabble member generally parallel to said shaft, an adjusting screw having flanges closely engaging said lug and having a shank extending through said shaft, said shaft having a through transverse bore receiving said shank and of larger diameter than said shank, a collar surrounding said shaft and adapted for angular movement relative thereto, said collar having through transverse holes registering with the bore in said shaft, said collar hole on the side toward said lug being larger than said adjusting screw shank, and said collar hole on the opposite side being threaded, said shank having a threaded end in engagement therewith.

5. In a fluid meter of the wabble plate type, a straight central shaft, a wabble member carried in rotation thereby, a plurality of cylinders surrounding and parallel to said shaft, pistons in said cylinders, stems normal to said pistons and connected to said wabble member, guide pins between and beyond the ends of said cylinders and parallel to said shaft, elements carried by said wabble member and engaging said guide pins, a spider surrounding said shaft and rigidly connected to the outer end of each of said pins, and a bearing for said shaft carried by said spider.

6. A fluid meter assembly comprising a block with a plurality of cylinders formed therein, an actuating assembly comprising a straight central shaft parallel with said cylinders, a bearing for said shaft within said block, a wabble member carried by said shaft, a piston in each of said cylinders and a stem on each piston operatively connecting the piston with said wabble member, a housing on one end of said cylinder block, said housing forming a chamber, a plurality of guiding elements for said wabble member on the other end of said block, said elements comprising a plurality of pins parallel with said shaft and approximately as remote therefrom as said piston stems, a spider connecting the free ends of said pins remote from said block, bearing elements for said shaft in said spider, and a second housing on said other end rigidly engaging said spider.

7. In a mechanism of the class described, a central shaft and a plurality of cylinders disposed thereabout, pistons in said cylinders, stems attached to said pistons, a wabble member on said central shaft operatively connected by said stems with said pistons, a sump below said cylinders and having an inlet for fluid, said cylinders having ports leading to said sump, there being a discharge passage between said cylinders and around said shaft, and a valve in said sump rotated by said shaft and seated in the direction of fluid flow upon the bottoms of all said cylinders, said valve comprising a portion connecting the cylinder ports with the discharge passage and other portions of less diameter cutting off said discharge passage from said sump but allowing communication between said sump and said cylinder ports, and a spring in said sump supporting said valve.

8. In a mechanism of the class described, a central shaft and a plurality of cylinders disposed thereabout, pistons in said cylinders, stems attached to said pistons, a wabble member on said central shaft operatively connected by said stems with said pistons, a sump below said cylinders and having an inlet for fluid, said cylinders having ports leading to said sump, there being a discharge passage between said cylinders and around said shaft, and a valve in said sump rotated by said shaft and seated in the direction of fluid flow upon the bottoms of all said cylinders, said valve comprising a portion connecting the cylinder ports with the discharge passage and other portions of less diameter cutting off said discharge passage from said sump but allowing communication between said sump and said cylinder ports, supporting means for said valve, said valve being axially movable with respect to said shaft.

9. In a mechanism of the class described, a central shaft and a plurality of cylinders disposed thereabout, pistons in said cylinders, stems attached to said pistons, a wabble member on said central shaft operatively connected with said pistons, a sump below said cylinders and having an inlet for fluid, said cylinders having ports leading to said sump, there being a discharge passage between said cylinders and around said shaft, and a valve in said sump rotated by said shaft and seated in the direction of fluid flow upon the bottoms of all said cylinders, said valve comprising a portion connecting the cylinder ports with the discharge passage and other portions of less diameter cutting off said discharge passage from said sump but allowing communication between said sump and said cylinder ports.

10. A meter of the wabble plate type having a casing, a straight central shaft, a wabble plate fixed for rotation with, but movable as to inclination in respect to said shaft, means for changing and maintaining the inclination between said wabble plate and said shaft, bearings for said shaft supported from said casing on opposite sides of said wabble plate, a plurality of cylinders surrounding said shaft at equal distances, a piston in each of said cylinders, and a stem connecting each said piston with said wabble plate, guide members parallel to said shaft at equal distances therefrom, guiding elements on said wabble plate adapted to coact with said guide members, said distances being approximately equal to the distances of said piston stems from said shaft, said shaft continuing beyond one bearing and beyond the ends of said cylinders remote from the wabble member, said cylinders having valve ports through said ends, a valve rotatable with said shaft, and means for maintaining said valve seated on said ports under normal operating conditions, but permitting axial movement of said valve in response to back pressure.

11. A fluid meter mechanism comprising a casing, a shaft rotatable therein by the passage of fluid through the meter, a plurality of cylinders surrounding said shaft and parallel thereto, pistons therein, a stem on each piston, a wabble member rigidly carried upon said shaft in inclined relation, said stems being operatively connected to said wabble member, and means for changing the inclination of said wabble member.

12. In a wabble type meter, a rotatable main shaft, a wabble member inclined thereto, means carried by the shaft and the wabble member engaging both for selectively altering the inclination of said member to said shaft, said altering means including means for locking said member at any selected inclination within a definite range.

13. A fluid meter mechanism comprising a casing having a central axis, a plurality of parallel cylinders surrounding said central axis, pistons in said cylinders, rotatable valve means controlling the flow of fluid into and out of said cylinders, a shaft mounted to rotate at said central axis and operatively connected to said valve means, a wabble member connected to said pistons and carried by said shaft, and means carried by said shaft and said wabble member for changing the inclination of said wabble member.

IRA G. LOE.